March 25, 1969  A. T. LYMAN  3,435,290
VOLTAGE SURGE PROTECTOR FOR SUBMERGED DEEP WELL PUMP MOTORS
Filed Dec. 15, 1966  Sheet 1 of 3

Inventor,
Arthur T. Lyman,
by Gilbert P. Tarleton
His Attorney.

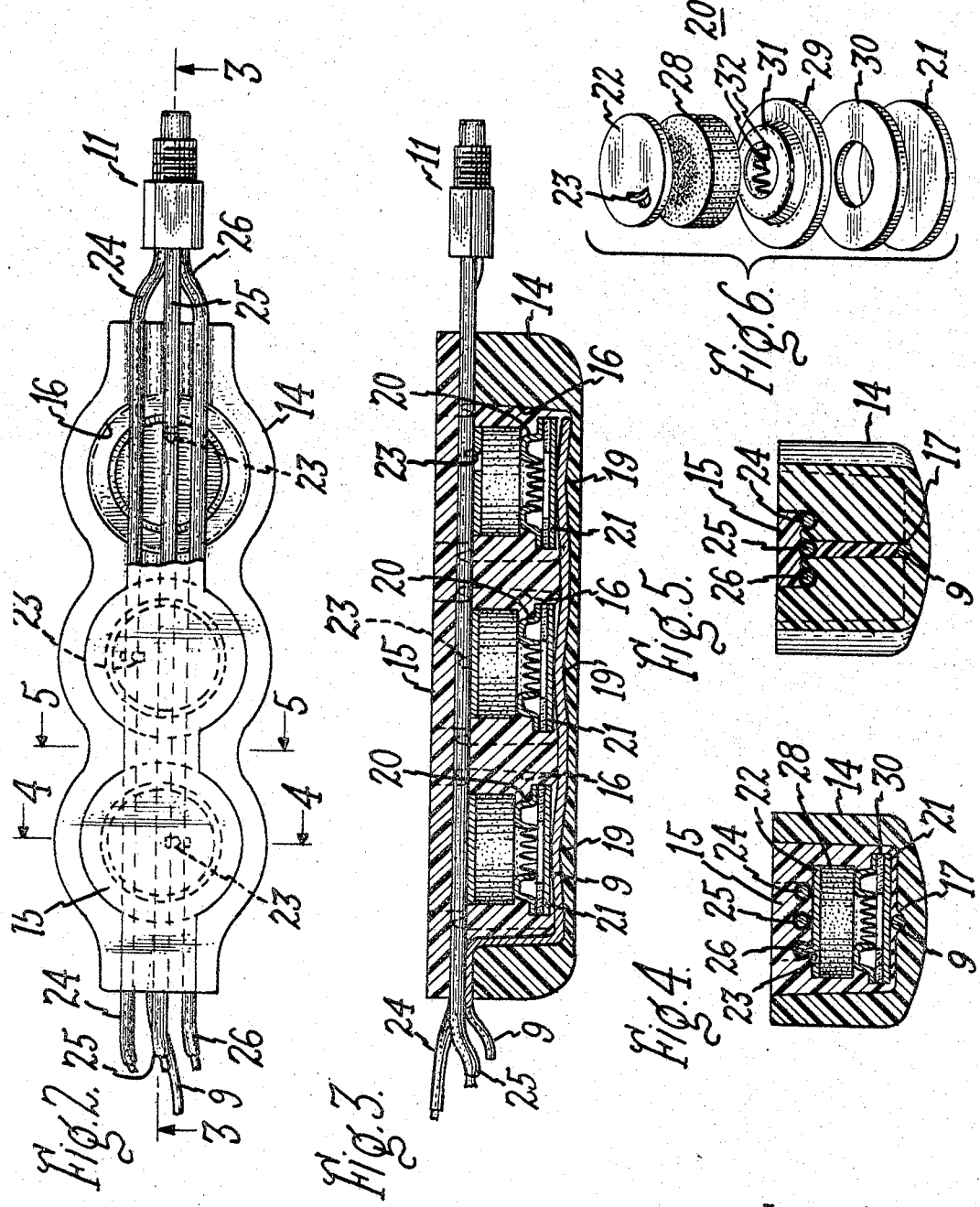

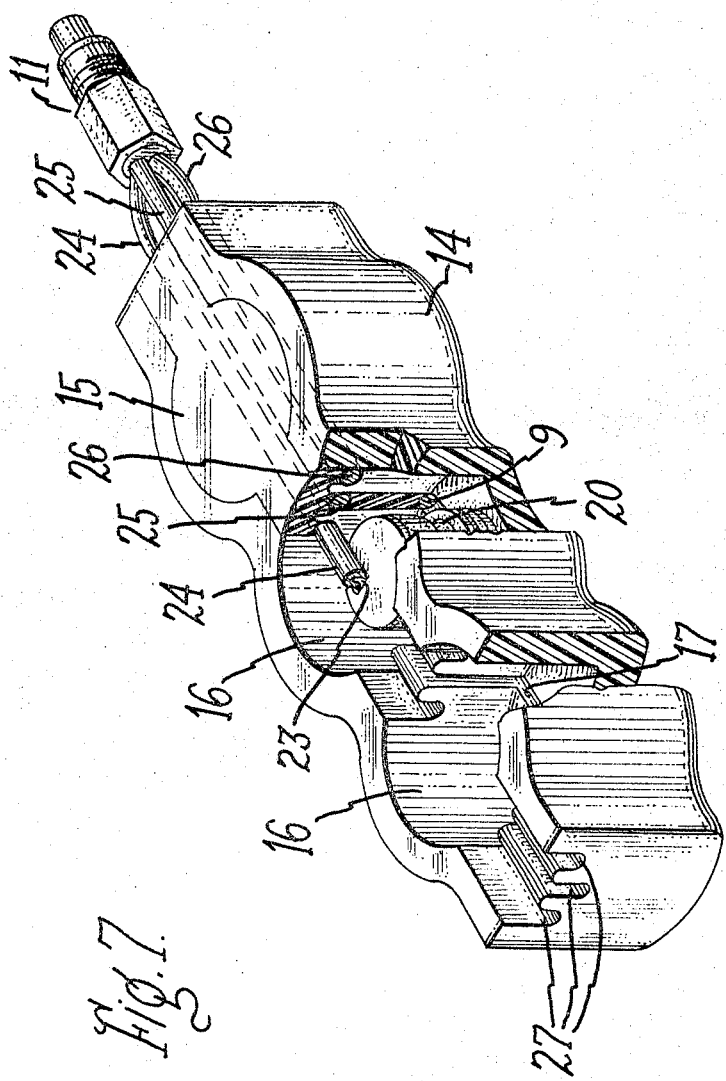

United States Patent Office 3,435,290
Patented Mar. 25, 1969

3,435,290
VOLTAGE SURGE PROTECTOR FOR SUBMERGED DEEP WELL PUMP MOTORS
Arthur T. Lyman, North Canton, Ohio, assignor to General Electric Company, a corporation of New York
Filed Dec. 15, 1966, Ser. No. 602,088
Int. Cl. H02h 7/08, 3/22
U.S. Cl. 317—13                    11 Claims

ABSTRACT OF THE DISCLOSURE

A submersible lightning arrester for deep well pump motors having an elongated sealed housing containing a plurality of duplicate valve type arrester elements extending crosswise of the housing and equally spaced lengthwise of the housing with integral leads extending from opposite ends of the housing terminating in complementary detachable waterproof electrical connectors for mating respectively with a connector on the pump motor and on the end of the motor supply line.

---

Figure 1:
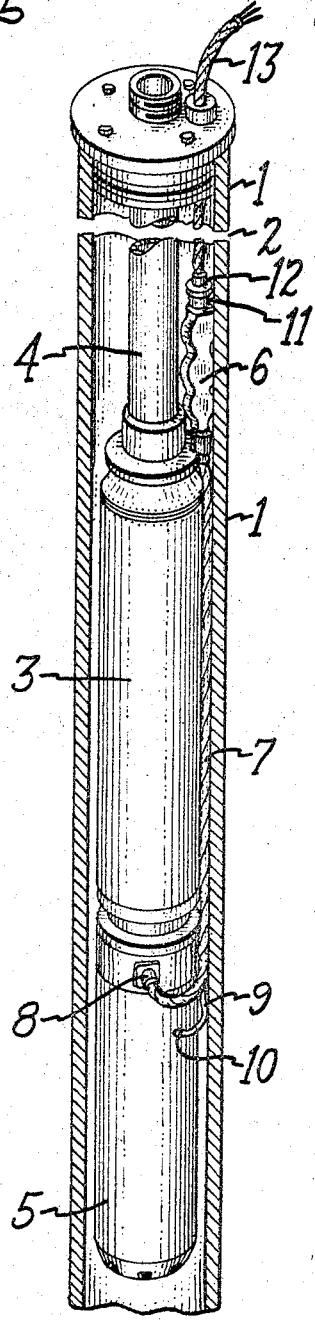

This invention relates to voltage surge protectors or lightning arresters and more particularly to a submersible protector for deep well pump motors.

Heretofore attempts to protect such motors have been limited to the use of conventional arresters, often hundreds of feet from the motor, connected to the power circuit above ground at the motor control box or elsewhere on the incoming circuit ahead of the control box. However, even with such protection, there is a substantial problem with insulation failure of such motors due to overvoltage. Such overvoltage may be the result of ineffective grounding of the arrester due to poor soil conditions at the arrester compared with the inherent effective solid grounding of the motor frame, circuit inductance, amplification of reduced surges passed by the arrester due to their reflection from the motor back through the long motor leads or ground currents inducing surges between the arrester and the motor.

In accordance with this invention, there is provided a novel, compact and simple submersible arrester which may be incorporated as an integral part of the motor lead so as to be located as close to the motor as possible thus eliminating the above causes of motor failure.

An object of the invention is to provide a new and improved voltage surge protector.

Another object of the invention is to provide a submersible lightning arrester for protection of deep well pump motors.

A further object of the invention is to provide a short length electrical lead for deep well pump motors, such lead having an integral elongated multi-pole lightning arrester therein and terminating in waterproof connectors.

A further object of the invention is to make possible a voltage surge protector with a short and continuous metallic ground circuit between the protector and the motor frame.

The invention will be better understood from the following description taken in connection with the accompanying drawings and its scope will be pointed out in the appended claims.

Figure 8:
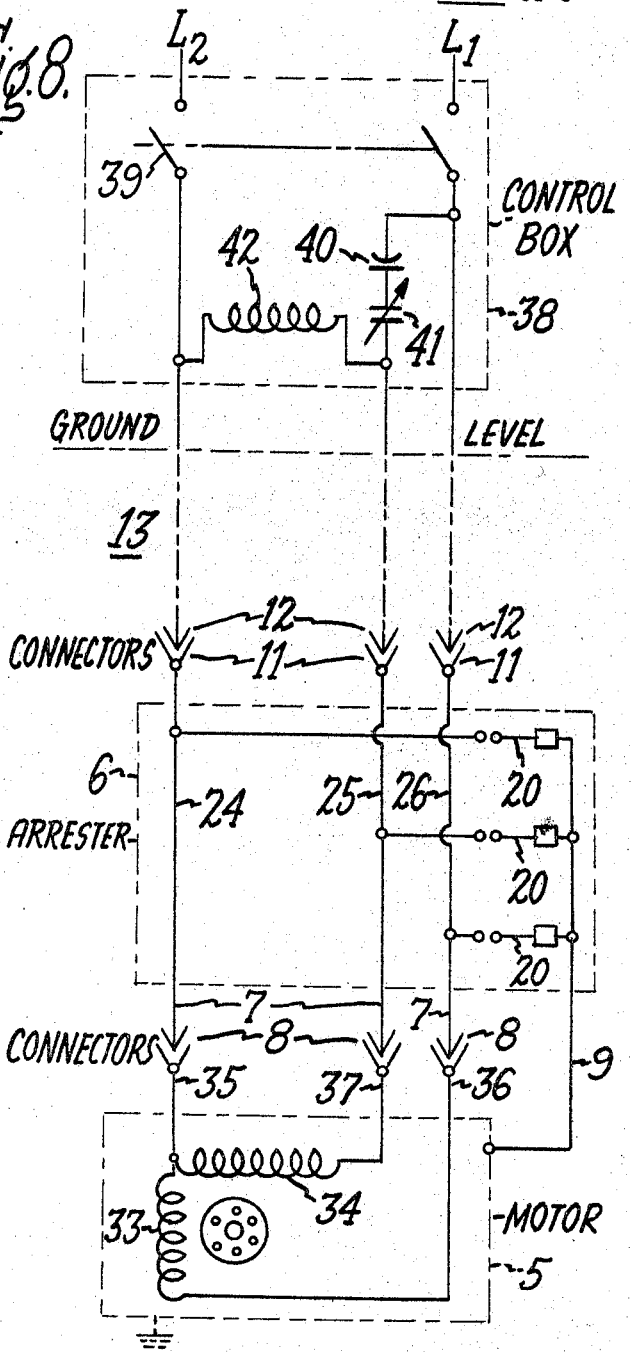

In the drawings,

FIG. 1 is a vertical sectional view of a deep well near the bottom showing the location and connections of an embodiment of the invention relative to a pump, driving motor for the pump and outlet pipe from the pump, FIG. 2 is a top view partly broken away and partly in phantom of a preferred embodiment of the invention, FIG. 3 is a longitudinal sectional view taken on line 3—3 of FIG. 2, FIGS. 4 and 5 are cross sectional views taken on lines 4—4 and 5—5 respectively of FIG. 2, FIG. 6 is an exploded view of one unit or pole of the arrester, FIG. 7 is a broken away partially assembled perspective view of the arrester shown in the preceding figures, and FIG. 8 is a circuit diagram.

Referring now to the drawings and more particularly to FIG. 1, a deep well casing, commonly of steel pipe, is indicated at 1 and is shown broken at 2 so that most of the figure illustrates the bottom portion of the well which is commonly 50 to 500 feet deep. The shortened top portion indicates the capped top of the well. The well casing 1 may or may not extend down to the bottom of the well; common practice is to end the casing several feet into rock ledge. Inside the well near the bottom thereof is a pump 3 of any suitable type, such as a centrifugal pump, and extending from the top thereof is an outlet pipe 4. The pump 3 is driven by an electric motor 5 which is directly coupled to the pump and which is conventionally located below the pump because there usually is not enough space between the well casing and the outlet pipe of the pump for locating the motor above the pump. A lightning arrester in accordance with the present invention is indicated at 6 immediately above the pump and between the well casing or well wall and the outlet pipe 4 of the motor. The transverse dimensions of the arrester 6 allow for its installation between a 4" inside diameter well casing 1 and a 1½" outside diameter concentric outlet pipe 4. The arrester 6 is preferably provided with an integral motor lead 7 extending from the lower end thereof between the well casing 1 and the pump 3 and terminating in an electrical connector 8 for mating with a complementary connector on the motor 5. In addition to the lead 7 there is a bare ground wire 9 which also extends from the lower end of the arrester to a ground connection or screw 10 on the motor frame or pump frame if it in turn is connected metallically to the motor frame. The arrester is also preferably provided with a connector 11 at its upper or line end for mating with a complementary connector 12 on the power supply lead or line 13 running the length of the well from above ground. As shown the line 13 conventionally has three insulated wires or conductors and one arrester pole must be furnished for each insulated conductor to the motor. The overall length of the lead 7 and the arrester 6 between its connectors 8 and 11 is typically of the order of four to ten feet.

Referring now to FIGS. 2–5 and 7, the arrester housing consists of a molded preformed main body 14 and a plastic filler-closure 15 which may be of the same material from which the main portion 14 of the housing is formed such as epoxy resin which may be filled with a non-tracking additive or filler such as hydrated alumina. As shown the main portion 14 of the housing contains three transversely extending well-cavities 16 which are generally equally spaced lengthwise of the housing. Also molded in the housing is a groove 17 running the length of the housing along the bottoms of the well cavities 16 in which is located the bare ground wire or lead 9 of the arrester.

As shown most clearly in FIG. 3 the bottom of the groove 17 is raised slightly at 19 in the vicinity of the center of the bottom of each well cavity 16.

Located in each well cavity is a separate valve type lightning arrester unit 20 extending generally crosswise of the housing. The bottom element of each arrester unit is a metal disc 21 for making direct contact with the bare ground wire 9 especially where it is raised by the humps 19 in the groove 17. The top of each lightning arrester unit comprises another metal disc 22 having an integral sharp pointed upwardly extending tongue 23. Running the length of the housing above the plates 22 are three insulated wires 24, 25, and 26. These are seated in grooves 27 in the main portion 14 of the housing so as to be positioned side by side across the tops of the arrester units, i.e. over the discs 22. These discs are so oriented that their respective pointed tongues 23 are each under a different one of the three insulated wires and puncture the insulation thereof so as to make electrical connection between the respective arrester units at their line end and a different one of the wires 24, 25, 26. This is shown most clearly in FIGS. 3, 4, and 7.

Also as shown in FIG. 7 the center groove 27 at the motor end of the arrester is deeper than the other grooves so that it can accommodate both the bare group wire 9 and the central insulated wire 25.

Referring now to FIG. 6, each arrester unit 20 includes between its bottom ground connection discs 21 and its top line connection disc 22 a valve resistor disc 28, a gap electrode 29, and a gap spacer 30 made of an insulating substance. The electrode 29 is in the form of a washer having a flat ring shaped outer bottom surface with an integral upturned upper central portion 31 terminating in a plurality of downwardly extending teeth 32 with pointed ends all lying in the plane of the bottom surface of the ring washer electrode 29. The insulating spacer 30, which may be a mica washer, thus spaces the tips of the electrode teeth 31 from the ground connection plate 21 by a distance exactly equal to the thickness of the spacer washer 30 so that the gap spacing is determined entirely and exactly by the thickness of the spacer 30. This is shown in FIGS. 3 and 4.

While the motor 5 may be any self-starting type of motor it is typically a so-called capacitor start split single phase induction motor and as shown diagrammatically in FIG. 8 it has a main winding 33 and a quadrature related start winding 34. These windings have a common terminal 35, a main terminal 36 and a start terminal 37. The motor supply circuit or lead 13 is connected to a control box 38 supplied with power from line conductors $L_1$ and $L_2$ which may be the normally ungrounded 230 volt single phase outer conductors of a conventional single phase circuit whose neutral (not shown) is grounded i.e. there is 115 volts between ground and each of the conductors $L_1$ and $L_2$, this being positive for one and negative for the other.

The control box may contain a switch 39 such as a pressure switch or float switch for automatically turning the pump motor on and off depending upon the demand for water. When switch 39 is closed, the main winding 33 is connected directly between $L_1$ and $L_2$ and the start winding 34 is connected between $L_1$ and $L_2$ through a capacitor 40 and the normally closed contacts 41 of a start relay having a high resistance voltage responsive winding 42 which in effect is connected across the start winding 34. When the motor 5 gets up to speed the counter EMF induced in the start winding 34 increases to a point where the energization of the coil 42 of the start relay is sufficient to pull this relay in and open its contacts 41 thus breaking the circuit of the start winding 34 and the capacitor 40.

It will be seen from FIG. 8 that each one of the valve type arrester units 20 is connected directly between the grounded motor frame through the bare ground lead 9 and a different one of the three supply conductors 24, 25 and 26 so that overvoltage on any of these conductors will cause discharge of its associated arrester unit so as to prevent that voltage from exceeding the insulation strength of the motor windings.

Not all deep well pump motors require a three-wire supply circuit. For example, the capacitor 40 may be mounted in or on the motor housing in which case only two supply conductors corresponding to $L_1$ and $L_2$ may be needed. Consequently the present invention also contemplates the use of a two-pole arrester, rather than a three-pole arrester for protecting such motors.

Not all deep well pump motors are provided with a detachable plug and socket or bayonet type connector and some have either a terminal board with binding posts or simply short leads to which the power supply conductors may be connected in any suitable manner such as by splicing. Consequently, it should be understood that the present invention is not limited to the use of a connector on one or both ends of the lead which contains the integral arrester and the invention contemplates such a lead which is also an integral part of the motor and is more or less permanently attached to the motor by the motor manufacturer.

What I claim as new and desire to secure by Letters Patent of the United States is:

1. The combination, with an electric motor having a grounded metallic housing containing two windings with ungrounded terminals supplied with power by a plurality of ungrounded electric power conductors which are subject to surges of voltage relative to ground, of a multipole lightning arrester physically closely adjacent to said motor, and means which is short relative to the length of said ungrounded electric power conductors for connecting the poles of said arrester respectively between the motor frame and said ungrounded electric power conductors at points thereon respectively adjacent said terminals.

2. The combination as in claim 1 in which said motor and arrester have hermetically sealed housings and are submerged near the bottom of a deep well.

3. The combination as in claim 2 wherein said means which is short relative to the length of said ungrounded electric power conductors comprises integral leads on said arrester extending in opposite directions for connection respectively to said motor and to said ungrounded supply conductors.

4. A submersible lightning arrester for protecting a submerged electric motor which drives a deep well pump comprising, in combination, an elongated water-tight housing of such lateral dimensions as to fit between the outlet pipe of the pump and the bore of a deep well, a predetermined number of valve type lightning arrester units mounted in said housing, each unit comprising a gap and a valve resistance physically and electrically in series, said units being physically parallel crosswise of said housing in a common plane, a like number plus one of flexible conductors of precut length substantially less than the depth of an ordinary well extending from one end of said housing for connection to said motor, said like number of said similar conductors being connected inside said housing respectively to similar ends of said units, the said one conductor being connected inside said housing to the other ends of all of said units, and a like number of supply conductors of precut length extending from the other end of said housing and connected therein respectively to said similar ends of said units.

5. A detachable submersible lead with an integral hermetically sealed lightning arrester for connection in a well casing between a deep well pump motor and a power supply line comprising, in combination, an elongated multi-pole arrester housing having a like number of insulated wires extending from each end and a bare ground wire extending from one end, the like number plus one wire extending from said one end being of a length comparable to the length of a deep well pump with the bare ground wire being for connection to the motor frame and the insulated wires being for connection to the motor windings, the like number of insulated wires extending from the other end being for connection to the power supply line.

6. A detachable submersible lead with an integral hermetically sealed lightning arrester for connection in a well casing between a deep well pump motor having an electrical connector and a power supply line having a complementary electrical connector comprising, in combination, an elongated multi-pole arrester having a like number of insulated wires extending from each end and a bare ground wire extending from one end, the like number plus one wires extending from said one end being of a length comparable to the length of a deep well pump with the like number of insulated wires extending from said one end terminating in an electrical connector corresponding to the power supply line connector for mating with the motor connector, the bare ground wire being for connection to the motor frame, the like number of insulated wires extending from the other end terminating in a connector corresponding with the motor connector for mating with the power supply line connector.

7. A detachable power supply lead with an integral lightning arrester for a deep well pump motor comprising, in combination, an elongated molded plastic housing having a plurality of transversely extending well cavities whose axes are parallel but extend transverse to the lengthwise dimension of the housing and are equally spaced along the length of said housing, a bare ground wire running the length of said housing across the bottom of said cavities and extending beyond one end only of said housing a distance comparable to the length of a deep well water pump, a separate valve type lightning arrester unit in each well cavity, each unit having a bottom end connected to said ground wire, a like number of insulated power supply wires running longitudinally of said housing across the tops of said well cavities and extending from opposite ends of said housing, means on top of each arrester unit for puncturing the insulation of a different one of said insulated wires for making a connection with its conductor, a plastic filler for the spaces in said well cavities and housing not occupied by said wires and arrester units for hermetically sealing said housing and firmly holding said wires and units in place, the insulated wires which extend from the same end of the housing as the bare ground wire being of approximately the same length as the latter.

8. A detachable power supply lead with an integral lightning arrester for a deep well pump motor comprising, in combination, an elongated molded plastic housing having a plurality of transversely extending well cavities whose axes are parallel but extend transverse to the lengthwise dimension of the housing and are equally spaced along the length of said housing, a bare ground wire running the length of said housing across the bottom of said cavities and extending beyond one end only of said housing a distance comparable to the length of a deep well water pump, a separate valve type lightning arrester unit in each well cavity, each unit having a bottom end connected to said ground wire, a like number of insulated power supply wires running longitudinally of said housing across the tops of said well cavities and extending from opposite ends of said housing, means on top of each arrester unit for puncturing the insulation of a different one of said insulated wires for making a connection with its conductor, a plastic filler for the spaces in said well cavities and housing not occupied by said wires and arrester units for hermetically sealing said housing and firmly holding said wires and units in place, the insulated wires which extend from the same end of the housing as the bare ground wire being of approximately the same length as the latter and terminating in a connector for mating with a connector on the motor, the other ends of the insulated wires terminating in a complementary connector.

9. A lightning arrester gap electrode comprising a metal washer having a flat outer ring surface on one side with an integral curved center portion on the other side terminating in a central concentric ring of pointed electrode teeth extending perpendicular to said one side and whose points are in the plane of said one side within said ring.

10. A lightning arrester gap one of whose electrodes is as in claim 9, and whose other electrode is a flat metal disc separated from said one side by a flat insulating ring spacer congruent with said outer ring on said one side whereby the gap spacing between the points of said teeth and said disc is equal to the thickness of said insulating ring spacer.

11. A lightning arrester unit having a gap as in claim 10, a valve resistor block in contact on one side with the curved portion of the washer electrode of said gap, and a metal disc in contact on one side with the other side of said valve block, said last mentioned disc having an integral turned out eccentric pointed tongue on the other side for puncturing the insulation of a line wire, the outer side of the disc electrode of the gap being for direct contact with a bare ground wire.

References Cited

UNITED STATES PATENTS

| 1,071,279 | 8/1913  | Deventer         | 317—68 X |
| 3,196,316 | 7/1965  | Crom             | 317—18   |
| 3,284,669 | 11/1966 | Boyd             | 317—13   |
| 3,348,098 | 10/1967 | Hausenfleck et al. | 317—13 |

JOHN F. COUCH, *Primary Examiner.*

J. D. TRAMMELL, *Assistant Examiner.*

U.S. Cl. X.R.

315—36; 317—31, 61.5, 68, 69